United States Patent
Chen et al.

(10) Patent No.: US 10,459,144 B2
(45) Date of Patent: *Oct. 29, 2019

(54) DISPLAY MODULE

(71) Applicant: Innolux Corporation, Chu-Nan, Miao-Li County (TW)

(72) Inventors: Bo-Tsuen Chen, Chu-Nan (TW); Hsia-Ching Chu, Chu-Nan (TW); Kuei-Ling Liu, Chu-Nan (TW); Kuo-Chang Su, Chu-Nan (TW)

(73) Assignee: INNOLUX CORPORATION, Chu-Nan, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/028,034

(22) Filed: Jul. 5, 2018

(65) Prior Publication Data

US 2018/0313994 A1 Nov. 1, 2018

Related U.S. Application Data

(63) Continuation of application No. 15/217,554, filed on Jul. 22, 2016, now Pat. No. 10,042,102.

(30) Foreign Application Priority Data

Jul. 29, 2015 (TW) .............................. 104212183 U

(51) Int. Cl.
*F21V 7/04* (2006.01)
*F21V 8/00* (2006.01)
*G02F 1/1333* (2006.01)

(52) U.S. Cl.
CPC ......... *G02B 6/0025* (2013.01); *G02B 6/0045* (2013.01); *G02B 6/0053* (2013.01); *G02F 1/133308* (2013.01); *G02F 2001/133317* (2013.01)

(58) Field of Classification Search
CPC .. G02B 6/0068; G02B 6/0031; G02B 6/0016; G02B 6/0055; G02B 6/0023; G02F 1/133615; G02F 1/33606
See application file for complete search history.

(56) References Cited

U.S. PATENT DOCUMENTS 7,641,374 B2 1/2010 Chen et al.

*Primary Examiner* — Jamara A Franklin
(74) *Attorney, Agent, or Firm* — Rabin & Berdo, P.C.

(57) ABSTRACT

A display module including a display panel and a backlight module disposed on a side of the display panel is provided. The backlight module includes a light guide, a light emitting diode, and a first optical film. The light emitting diode has a light emitting surface adjacent to the light guide. The first optical film is located between the light guide and the display panel. The first optical film includes a first prisms extending along a first direction. The first prisms has a first unit area and a second unit area. A first part of the first prism in the first unit area has a first average height larger than a second average height of a second part of the first prism in the second unit area.

20 Claims, 3 Drawing Sheets

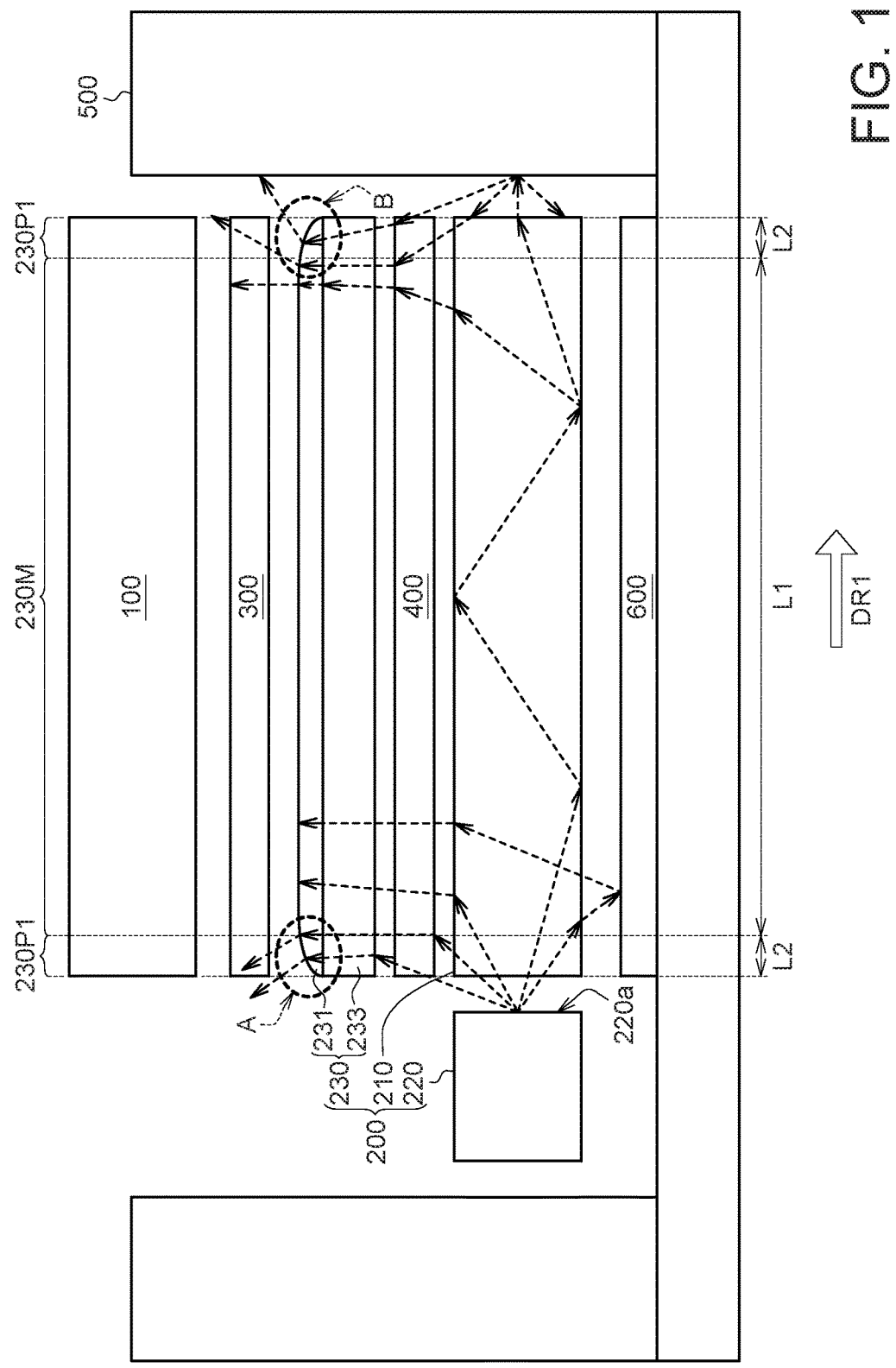

DISPLAY MODULE

This application is a continuation application of application Ser. No. 15/217,554, filed Jul. 22, 2016 (now allowed) and entitled "DISPLAY MODULE", which claims the benefit of Taiwan application Serial No. 104212183, filed Jul. 29, 2015, the contents of which are incorporated herein by reference.

BACKGROUND OF THE INVENTION

Field of the Invention

The present disclosure is related in general to a display module, and particularly to a display module having uniform brightness.

Description of the Related Art

Along with the advances of the modern video technology, liquid crystal displays have been widely applied in a variety of electronic products, such as cell phones, laptops, tablet PCs, personal digital assistants (PDAs), and etc. Since the liquid crystal display panel of a liquid crystal display does not emit lights, therefore, it is required to arrange a backlight module to the liquid crystal display panel for providing an area light source which the liquid crystal display panel needs, and thus the display effects of the liquid crystal display panel can be provided. Side-type backlight module has a relatively thin thickness and therefore has been largely applied in the liquid crystal display devices of cell phones, laptops, monitors, TVs, PDAs, and etc.

In a side-type backlight module, the function of a light guide is to guide the direction of lights for increasing the brightness of a display panel. However, while the uniformity of display brightness is low, such poor uniformity may have undesired influence on the display quality. Therefore, researchers have been working on providing display modules having excellent display qualities and uniform brightness.

SUMMARY OF THE INVENTION

The present disclosure is directed to a display module. In the display module of the embodiments, the main portion of the first optical film has a first height larger than a second height of the peripheral portion of the first optical film, such that the peripheral region of the first optical film has an inclined-downward morphology, thereby lights centered around the peripheral region of the first optical film can be scattered away, preventing or reducing the generation of hot spots from the incident lights from the LED, bright lines at edges generated from the lights reflected by the frame of the display module can be prevented or reduced as well, and hence the uniformity of brightness of the display module can be further improved.

According to an embodiment of the present disclosure, a display module is provided. The display module includes a display panel and a backlight module disposed on a side of the display panel. The backlight module includes a light guide, a light emitting diode, and a first optical film. The light emitting diode has a light emitting surface, and the light emitting surface is adjacent to the light guide. The first optical film is located between the light guide and the display panel. The first optical film includes a plurality of first prisms, and the first prisms extend along a first direction. The first prisms corresponding to the light emitting surface form a main portion and a peripheral portion located outside the main portion. The main portion has a first height, the peripheral portion has a second height, and the first height is larger than the second height.

The above and other aspects of the disclosure will become better understood with regard to the following detailed description of the preferred but non-limiting embodiment(s). The following description is made with reference to the accompanying drawings.

BRIEF DESCRIPTION OF THE DRAWINGS

FIG. 1 shows a cross-sectional view of a display module according to an embodiment of the present disclosure;

DETAILED DESCRIPTION OF THE INVENTION

Figure 2A:
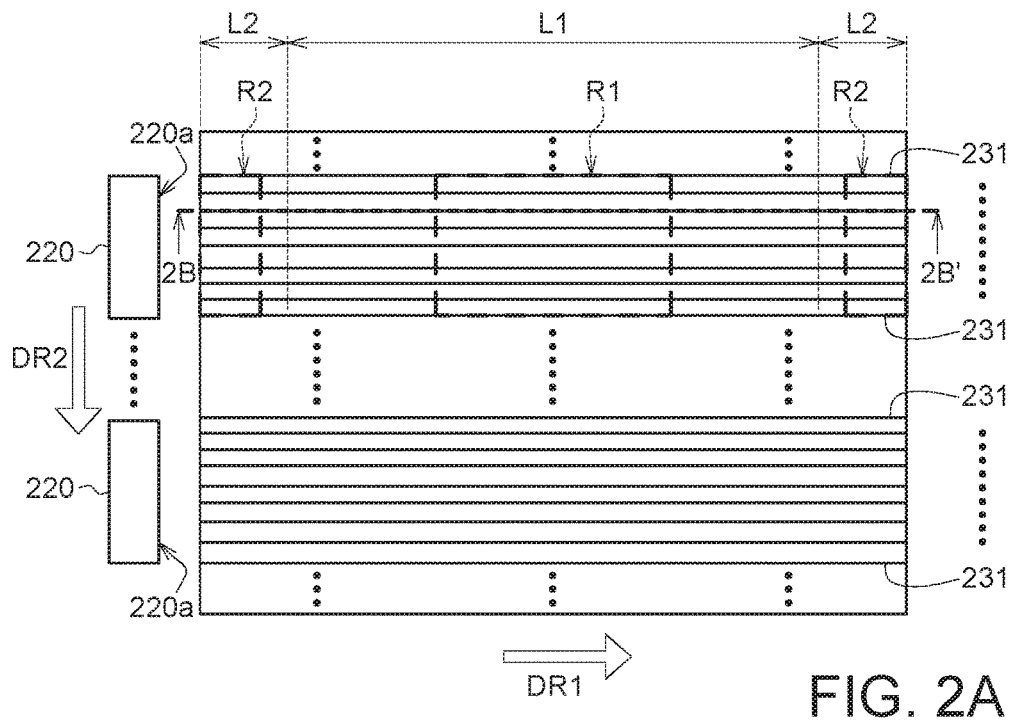
FIG. 2A shows a top view of a first optical film according to an embodiment of the present disclosure.

According to the embodiments of the present disclosure, in the display module, the main portion of the first optical film has a first height larger than a second height of the peripheral portion of the first optical film, such that the peripheral region of the first optical film has an inclined-downward morphology, thereby lights centered around the peripheral region of the first optical film can be scattered away, and hence the uniformity of brightness at edges of the display module can be further improved. The embodiments are described in details with reference to the accompanying drawings. The elements sharing similar or the same labels are similar or the same elements in the drawings. It is to be noted that some of the secondary elements are omitted in the drawings accompanying the following embodiments to highlight the technical features of the disclosure. The embodiments are for exemplification only, not for limiting the scope of protection of the disclosure. One of ordinary skills in the art may modify or change the structures according to actual needs.

FIG. 1 shows a cross-sectional view of a display module 10 according to an embodiment of the present disclosure. The display module 10 includes a display panel 100 and a backlight module 200 disposed on a side of the display panel 100. The backlight module 200 includes a light guide 210, a light emitting diode 220, and a first optical film 230. The light emitting diode 220 has a light emitting surface 220a, and the light emitting surface 220a is adjacent to the light guide 210. The first optical film 230 is located between the light guide 210 and the display panel 100. The first optical film 230 includes a plurality of first prisms 231, and these first prisms 231 extend along a first direction DR1. In the embodiment, the first direction DR1 is such as the normal line direction with respect to the light emitting surface 220a.

Figure 2B:
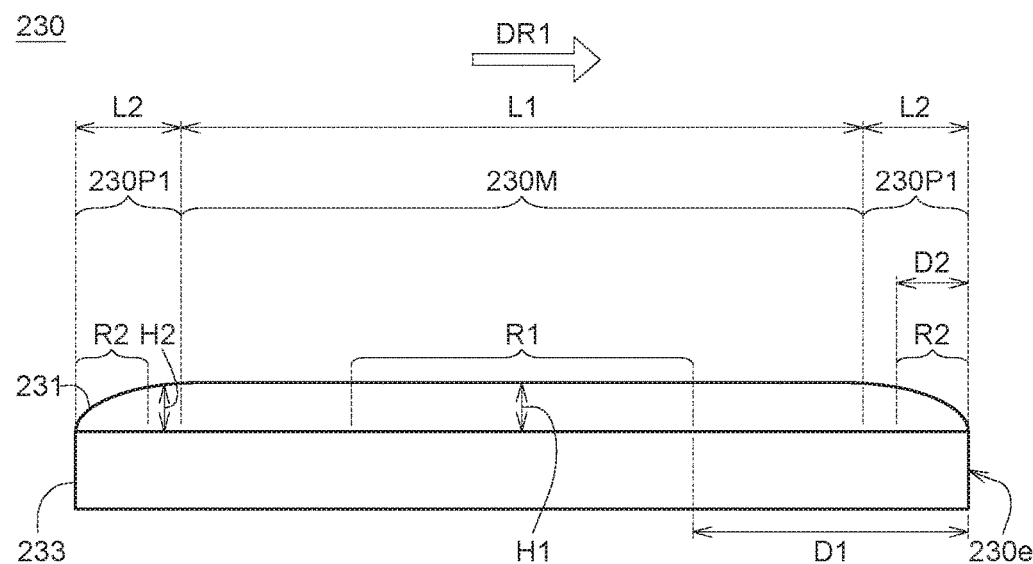
FIG. 2B shows a cross-sectional view along the cross-section line 2B-2B'.

FIG. 2A shows a top view of a first optical film 230 according to an embodiment of the present disclosure, and FIG. 2B shows a cross-sectional view along the cross-section line 2B-2B'. Specifically speaking, the cross-section line 2B-2B' represents a cross-section of one first prism 231 along the first direction DR1. As shown in FIGS. 2A-2B, a number of these first prisms 231 corresponding to the light emitting surface 220a is N, and N is 20-1000. In other words, 20-2000 first prisms 231 of the total first prisms 231 of the first optical film 230 are corresponding to the light emitting surface 220a. The N first prisms form a main portion 230M and a peripheral portion 230P1. In other words, 20-1000 first prisms 231 corresponding to the light emitting surface 220a form the main portion 230M and the peripheral portion 230P1. The peripheral portion 230P1 is located outside the main portion 230M. The main portion 230M has a first height H1, the peripheral portion 230P1 has a second height H2, and the first height H1 is larger than the second height H2.

In the embodiment, as shown in FIGS. 1 and 2A-2B, the peripheral portion 230P1 may include such as two parts located at two outer sides of the main portion 230M respectively.

As shown in FIGS. 2A-2B, the main portion 230M and the peripheral portion 230P1 are formed by the first prisms 231. In other words, each of the first prisms 231 corresponding to the light emitting surface 220a forms a part of the main portion 230M and a part of the peripheral portion 230P1.

In the embodiment, as shown in FIG. 2B, the backlight module 200 may include a plurality of the light emitting diodes 220, and these light emitting diodes 220 are arranged along a direction DR2 which is about perpendicular to the first direction DR1. Each of the light emitting surfaces 220a is corresponding to N first prisms 231. In the embodiment, a light emitting surface 220a of a light emitting diode 220 has a length of such as 2-7 µm and a width of such as 0.5-4 µm. The pitch of the first prisms 231 is about 24-75 µm. The number of the first prisms 231 corresponding to one light emitting surface 220a can be obtained by dividing the length of a light emitting surface 220a by the pitch of the first prisms 231, and this number is N. In an embodiment, N is such as 25-260; in another embodiment, N is such as 40-140.

In the embodiment, the surfaces of the main portion 230M and the peripheral portion 230P1 may not be flat surfaces, and thus the heights of different regions of the main portion 230M may not be constant, and the heights of different regions of the peripheral portion 230P1 may not be constant.

In an embodiment, the first height H1 is, for example, the average height calculated from heights of several selected points (i.e. 3-4 points) within an arbitrary unit area (i.e. 1 µm*1 µm) of the main portion 230M, and the second height H2 is, for example, the average height calculated from heights of several selected points (i.e. 3-4 points) within an arbitrary unit area (i.e. 1 µm*1 µm) of the peripheral portion 230P1. Among the selected points, for example, the first point may be located somewhere close to the main portion 230M, and the second to the fourth points are selected in order toward an outer edge 230e of the peripheral portion 230P1. The distance between two points is such as 0.2 µm. The "average height" described hereinafter is calculated according to the above-described method.

In an embodiment, the first height H1 is such as a maximum height of the main portion 230M.

In an embodiment, the N prisms 231 have a plurality of prism peaks, and the first height H1 is such as an average height of the prism peaks of the N first prisms 231.

According to the embodiments of the present disclosure, the first height H1 of the main portion 230M is larger than the second height H2 of the peripheral portion 230P1, such that the peripheral region of the first optical film 230 has an inclined-downward morphology, thereby lights centered toward the display panel can be scattered away, and the uniformity of brightness at edges of the display module can be improved. For example, as shown in FIG. 1, the lights passing through the main portion 230M can be centered and emit upward, and the lights passing through the peripheral portion 230P1 can be scattered away toward lateral sides; as such, lights can be prevented from being centered at the edge region A of the first optical film 230, and thus chances of brightness being too high and generation of bright lines or hot spots at the edge region A can be reduced.

In the embodiment, as shown in FIGS. 1 and 2A, the peripheral portion 230P1 forms a bending segment toward a direction away from the main portion 230M. The second height H2 of the peripheral portion 230P1 substantially gradually decreases. That is, in the process of the surface of the peripheral portion 230P1 bending toward the direction away from the main portion 230M, the second height H2 gradually decreases along with the bending process. The second height H2 within the bending segment may slightly increase a bit and then keeps decreasing again due to the irregular morphology or protrusions of the bending surface; still, the second height H2 substantially gradually decreases toward the direction away from the main portion 230M.

According to the embodiments of the present disclosure, the bending segment of the peripheral portion 230P1 can scatter away the lights centered toward the display panel more effectively, preventing the lights from being centered at the edge region A of the first optical film 230, reducing the chances of generation of hot spots due to brightness being too high, and thus the uniformity of brightness of the display module can be improved more effectively.

In an embodiment, as shown in FIGS. 2A-2B, the main portion 230M may have a first region R1, the first region R1 extends from a center of the main portion 230M toward the peripheral region 230P1 at a location spaced apart from an outer edge 230e of the peripheral portion 230P1 by about 250 µm, the peripheral portion 230P1 may have a second region R2, and the second region R2 extends from the outer edge 230e toward the main portion 230M by about 20 µm. In other words, the first region R1 includes a range extending from the center toward two sides until being spaced apart from the two outer edges 230e respectively by a distance D1 of about 250 µm, and the second region R2 includes a range extending from the outer edge 230e toward the main portion 230M until being spaced apart from the outer edge 230e by a distance D2 of about 20 µm. In the embodiment, the first region R1 has a first average height, the second region R2 has a second average height, and the first average height is larger than the second average height.

As shown in FIG. 1, in the embodiment, the first optical film 230 further includes a first transparent substrate 233, and the first prisms 231 are disposed on the first transparent substrate 233.

As shown in FIGS. 1 and 2A-2B, in the embodiment, the main portion 230M has a first length L1 along the first direction DR1, the peripheral portion 230P1 has a second length L2 along the first direction DR1, and a ratio of the first length L1 to the second length L2 is such as 100-10000.

As shown in FIG. 1, the display module 10 may further include a second optical film 300 located on the first optical film 230. In the embodiment, the second optical film 300 is such as a diffuser sheet, a brightness-enhancement sheet, or a brightness-enhancement diffuser sheet. In the embodiments, the brightness-enhancement sheet may have a prism structure, the brightness-enhancement diffuser sheet may be a composite film combining a diffuser sheet and a brightness-enhancement sheet, or a composite film of a brightness-enhancement sheet coated with a diffuser sheet material.

As shown in FIG. 1, the display module 10 may further include a third optical film 400 located below the first optical film 230. In the embodiment, the third optical film 400 is such as a diffuser sheet, and the diffuser sheet may have a micro lens structure. As shown in FIG. 1, the third optical film 400 is such as located between the first optical film 230 and the light guide 210.

As shown in FIG. 1, the display module 10 may further include a frame 500, and the frame 500 surrounds the display panel 100 and the backlight module 200. In the embodiment, the frame 500 is disposed such as adjacent to the peripheral portion 230P1. In the embodiment, the frame 500 is such as a white plastic frame or a metal frame.

According to the embodiments of the present disclosure, the first height H1 of the main portion 230M is larger than the second height H2 of the peripheral portion 230P1, such that the peripheral region of the first optical film 230 has an inclined-downward morphology, thereby reflected lights from the frame 500 can be scattered away, preventing reflected lights from being centered again at the peripheral portion 230P1 of the first optical film 230, bright lines at edges can be prevented as well, and hence the uniformity of brightness of the peripheral portion 230P1 can be improved. For example, as shown in FIG. 1, the lights passing through the main portion 230M are centered and emit upward, and the lights passing through the peripheral portion 230P1 are scattered away toward lateral sides; as such, lights can be prevented from being centered at the edge region B of the first optical film 230, and thus chances of generation of bright lines at the edge region B caused by the reflected lights from the white frame 500 can be reduced.

As shown in FIG. 1, the display module 10 may further include a reflective sheet 600. The reflective sheet 600 is disposed adjacent to the light guide 210 and located on an opposite side of the first optical film 230 with respect to the light guide 210.

Figure 3:
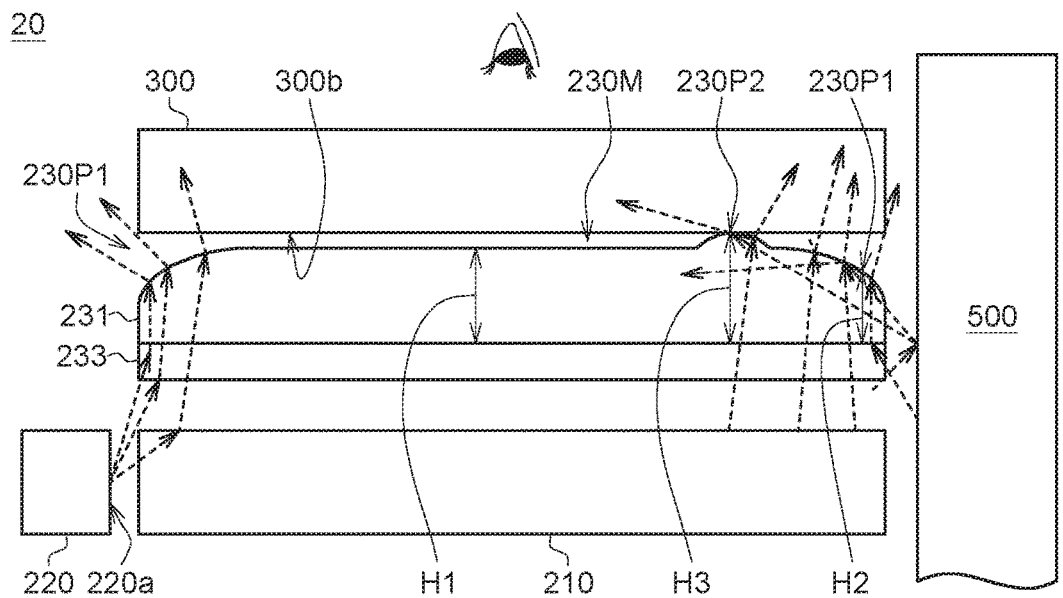
FIG. 3 shows a partial cross-sectional view of a display module according to another embodiment of the present disclosure.

FIG. 3 shows a partial cross-sectional view of a display module 20 according to another embodiment of the present disclosure. The elements in the present embodiment sharing similar or the same labels with those in the previous embodiment are similar or the same elements, and the description of which is omitted.

The display module 20 of the present embodiment is different from the display module 10 of the previous embodiment mainly in the design of the protrusion. In addition, it is to be noted that some of the elements are omitted in the drawings of the present embodiment to describe the present embodiment more clearly. However, the display module 20 of the present embodiment may include other components which the display module 10 includes, as shown in FIG. 1, such as the display panel 100, the third optical film 400, the reflective sheet 600, and etc., and the description of which is omitted.

As shown in FIG. 3, in the first optical film 230, the N first prisms 231 corresponding to the light emitting surface 220a form at least one protrusion 230P2 between the peripheral portion 230P1 and the main portion 230M. The protrusion 230P2 has a third height H3, and the third height H3 is larger than the first height H1.

In the embodiment, the third height H3 is larger than the first height H1 by about 5-60 μm.

In an embodiment, the third height H3 is, for example, the average height calculated from heights of several selected points (i.e. 3-4 points) within an arbitrary unit area (i.e. 1 μm*1 μm) of the protrusion 230P2.

As shown in FIG. 3, in the embodiment, the protrusion 230P2 is in contact with a bottom surface 300b of the second optical film 300.

According to the embodiments of the present disclosure, the protrusion 230P2 may be provided with functions similar to that of a convex lens, which can refract lights and scatter away the lights centered at the center of the display panel, and thus the uniformity of brightness of the display module is further improved. Moreover, the protrusion 230P2 contacts the bottom surface 300b of the second optical film 300; that is, the first optical film 230 is connected to the second optical film 300 via a relatively small contact area, as such, the prism peaks of the first prisms 231 of the first optical film 230 can be prevented from being damaged by the bottom surface 300b of the second optical film 300.

Figure 4:
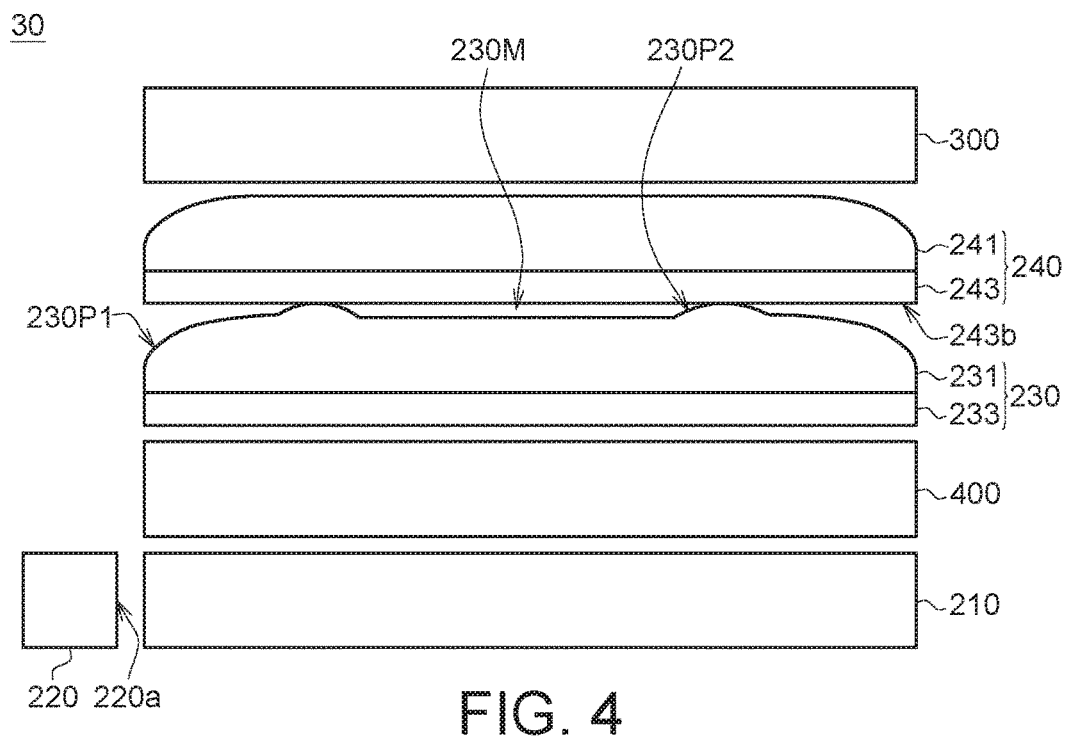
FIG. 4 shows a partial cross-sectional view of a display module according to a further embodiment of the present disclosure.

FIG. 4 shows a partial cross-sectional view of a display module 30 according to a further embodiment of the present disclosure. The elements in the present embodiment sharing similar or the same labels with those in the previous embodiment are similar or the same elements, and the description of which is omitted.

The display module 30 of the present embodiment is different from the display module 20 of the previous embodiment mainly in the design of the second prisms. In addition, it is to be noted that some of the elements are omitted in the drawings of the present embodiment to describe the present embodiment more clearly. However, the display module 30 of the present embodiment may include other components which the display modules 10 and 20 include, as shown in FIGS. 1 and 3, such as the display panel 100, the third optical film 400, the reflective sheet 600, and etc., and the description of which is omitted.

As shown in FIG. 4, the display module 30 includes a fourth optical film 240 located between the first optical film 230 and the second optical film 300. The fourth optical film 240 includes a plurality of second prisms 241 arranged in a fashion similar to that the first prisms 231 are arranged as shown in FIG. 2B. The second prisms 241 are located on the first prisms 231 and extending along a second direction (not shown in drawing). The second direction is different from the first direction DR1. In the embodiment, an angle between the first direction DR1 and the second direction is such as 2-178°.

As shown in FIG. 4, the fourth optical film 240 further includes a second transparent substrate 243, and the second prisms 241 are disposed on the second transparent substrate 243. In the embodiment, the protrusion 230P2 is in contact with a bottom surface 243b of the second transparent substrate 243. The protrusion 230P2 contacts the bottom surface 243b of the second transparent substrate 234; that is, the first prisms 231 of the first optical film 230 are connected to the second transparent substrate 234 via a relatively small contact area, as such, the prism peaks of the first prisms 231 of the first optical film 230 can be prevented from being damaged by the bottom surface 243b of the second transparent substrate 234.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display module, comprising:
   a display panel; and a backlight module disposed on a side of the display panel, the backlight module comprising:
a light guide;
a light emitting diode having a light emitting surface, wherein the light emitting surface is adjacent to the light guide; and
a first optical film located between the light guide and the display panel, the first optical film comprising a first prism, the first prism extending along a first direction;
wherein the first prism has a first unit area and a second unit area;
wherein an edge of the first unit area is spaced apart from an outer edge of the first prism by 250 µm, an edge of the second unit area is located at the outer edge of the first prism, sizes of the first unit area and the second unit area are 1 µm*1 µm respectively, a first part of the first prism in the first unit area has a first average height, a second part of the first prism in the second unit area has a second average height, and the first average height is larger than the second average height.

2. The display module according to claim 1, wherein the second part of the first prism in the second unit area has an inclined-downward morphology.

3. The display module according to claim 1, wherein a third part of the first prism in a third unit area has a third average height, the third part of the first prism is located between the first part of the first prism and the second part of the first prism, and the third average height is larger than the first average height.

4. The display module according to claim 1, wherein a third part of the first prism in a third unit area has a third average height, the third part of the first prism is located between the first part of the first prism and the second part of the first prism, and the third average height is larger than the second average height.

5. The display module according to claim 4, wherein the third average height is larger than the first average height.

6. The display module according to claim 1, wherein a ratio of the first average height to the second average height is in a range of 100 to 10000.

7. The display module according to claim 1, further comprising an extra optical film, wherein the extra optical film comprises a second prism having an unit area and another unit area, wherein an edge of the unit area is spaced apart from an outer edge of the second prism by 250 µm, an edge of the another unit area is located at the outer edge of the second prism, sizes of the unit area and the another unit area are 1 µm*1 µm respectively, a first part of the second prism in the unit area has an average height, a second part of the second prism in the another unit area has another average height, and the average height is larger than the another average height.

8. The display module according to claim 7, wherein the second part of the second prism in the another unit area has an inclined-downward morphology.

9. The display module according to claim 7, wherein the second prism is located on the first prism and extending along a second direction, and an angle between the first direction and the second direction is in a range from 2° to 178°.

10. The display module according to claim 7, wherein the extra optical film further comprises a transparent substrate, and the second prism is disposed on the transparent substrate.

11. The display module according to claim 1, further comprising a second optical film located on the first optical film.

12. The display module according to claim 11, wherein the second optical film is a diffuser sheet, a brightness-enhancement sheet, or a brightness-enhancement diffuser sheet.

13. The display module according to claim 11, further comprising a third optical film located below the first optical film.

14. The display module according to claim 13, wherein the third optical film is a diffuser sheet.

15. A display module, comprising:
a display panel; and
a backlight module disposed on a side of the display panel, the backlight module comprising:
a light guide;
a light emitting diode having a light emitting surface, wherein the light emitting surface is adjacent to the light guide; and
a first optical film located between the light guide and the display panel, the first optical film comprising a first prism, the first prism extending along a first direction;
wherein the first prism has a first region and a second region;
wherein an edge of the first region is spaced apart from an outer edge of the first prism by 250 um, the second region is extending from the outer edge of the first prism by 20 um, the first region has a first average height, the second region has a second average height, and the first average height is larger than the second average height.

16. The display module according to claim 15, wherein the second region has an inclined-downward morphology.

17. The display module according to claim 15, wherein a part of the first prism has a third average height, the part of the first prism is located between the first region and the second region, and the third average height is larger than the first average height.

18. The display module according to claim 15, wherein a part of the first prism has a third average height, the part of the first prism is located between the first region and the second region, and the third average height is larger than the second average height.

19. The display module according to claim 18, wherein the third average height is larger than the first average height.

20. The display module according to claim 15, wherein a ratio of the first average height to the second average height is in a range of 100 to 10000.

* * * * *